US008795792B2

(12) United States Patent
Bowman et al.

(10) Patent No.: US 8,795,792 B2
(45) Date of Patent: Aug. 5, 2014

(54) PROCESS FOR FORMING MULTILAYER COATING WITH RADIATION CURABLE POLYENE/POLYTHIOL COATING COMPOSITIONS

(75) Inventors: Mark P. Bowman, New Kensington, PA (US); Stephen J. Thomas, Aspinwall, PA (US); David N. Walters, Slippery Rock, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 1146 days.

(21) Appl. No.: 11/840,292

(22) Filed: Aug. 17, 2007

(65) Prior Publication Data

US 2009/0047546 A1 Feb. 19, 2009

(51) Int. Cl.
*B05D 3/00* (2006.01)

(52) U.S. Cl.
USPC .......................... 427/553; 427/532; 427/385.5

(58) Field of Classification Search
USPC ........................................ 427/532, 385.5, 553
See application file for complete search history.

(56) References Cited

U.S. PATENT DOCUMENTS

| 3,355,512 | A | | 11/1967 | De Acetis |
| 3,748,190 | A | * | 7/1973 | Weber et al. ................. 428/336 |
| 3,877,971 | A | | 4/1975 | Guthrie |
| 3,898,349 | A | | 8/1975 | Kehr |
| 3,976,553 | A | | 8/1976 | Larsen |
| 4,008,341 | A | | 2/1977 | Kehr |
| 4,139,385 | A | | 2/1979 | Crivello |
| 4,233,205 | A | * | 11/1980 | O'Connor et al. ............ 524/871 |
| 4,234,676 | A | | 11/1980 | Hein |
| 4,425,472 | A | * | 1/1984 | Howard et al. ................ 526/301 |
| 4,682,612 | A | * | 7/1987 | Giuliano ......................... 132/73 |
| 4,808,638 | A | | 2/1989 | Steinkraus |
| 5,095,069 | A | | 3/1992 | Ambrose |
| 5,115,032 | A | * | 5/1992 | Takiyama et al. ............ 525/279 |
| 5,876,805 | A | | 3/1999 | Ostlie |
| 6,077,885 | A | * | 6/2000 | Hager et al. .................. 523/445 |
| 6,172,179 | B1 | | 1/2001 | Zook |
| 6,509,418 | B1 | | 1/2003 | Zook et al. |
| 6,639,046 | B1 | | 10/2003 | Van Dijk |
| 2009/0047442 | A1 | | 2/2009 | Bowman |
| 2009/0047443 | A1 | | 2/2009 | Bowman et al. |
| 2009/0047531 | A1 | | 2/2009 | Bartley et al. |
| 2009/0286002 | A1 | | 11/2009 | Iezzi et al. |

FOREIGN PATENT DOCUMENTS

| JP | 60/249111 A | 12/1985 |
| WO | 2000/064959 A1 | 11/2000 |
| WO | WO 00/71605 A1 | 11/2000 |
| WO | 2001/066621 A1 | 9/2001 |
| WO | 2004/099317 A1 | 11/2004 |
| WO | 2006/086211 A1 | 8/2006 |
| WO | 2008/027679 A1 | 3/2008 |

OTHER PUBLICATIONS

Sanui et al., "The Catalytic Effect of Alcohol and Mercaptan on the Michael Reaction of Acrylates", Bulletin of the Chemical Society of Japan, vol. 40, 1727 (1967).

* cited by examiner

*Primary Examiner* — Robert S Walters, Jr.
(74) *Attorney, Agent, or Firm* — Christine W. Trebilcock

(57) ABSTRACT

A process for forming a color-clear multilayer coating on a substrate is disclosed. The clear topcoat comprises a polyene and a polythiol that is radiation curable.

14 Claims, No Drawings

PROCESS FOR FORMING MULTILAYER COATING WITH RADIATION CURABLE POLYENE/POLYTHIOL COATING COMPOSITIONS

FIELD OF THE INVENTION

The present invention relates to a process for forming a multilayer coating, specifically a color-clear multilayer coating.

BACKGROUND OF THE INVENTION

Automotive coatings typically comprise a colored basecoat and a clear topcoat. For original equipment coatings, both coating layers are cured by heating in ovens at temperatures between 150-200° C. However, automotive refinish or repair coatings are applied in paint shops that do not have space for heating ovens and consequently such coatings must be curable at ambient temperature. The curing agents for such systems are limited and the most commonly used curing agents are polyisocyanates that are not environmentally friendly. Therefore, there is a need to find an alternative curing mechanism that is effective at ambient temperature.

SUMMARY OF THE INVENTION

The present invention is directed to a process for forming a multilayer coating on a substrate comprising forming a basecoat layer on the substrate and forming a clear topcoat layer on the basecoat layer in which the topcoat composition comprises a polyene and a polythiol. The topcoat composition is cured by exposure to radiation.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic. Likewise, allyl and methallyl are designated as (meth)allyl.

Aliphatic and cycloaliphatic are designated as (cyclo)aliphatic.

The term "radiation" means free radical generating radiation.

Suitable polyenes for use in the present invention are numerous and can vary widely. Such polyenes can include those that are known in the art. Non-limiting examples of suitable polyenes can include those that are represented by the formula:

$$A\text{-}(X)_m$$

wherein A is an organic moiety, m is an integer of at least 2, and X is an olefinically unsaturated moiety and m is at least 2, typically 2 to 4. Examples of X are groups of the following structure:

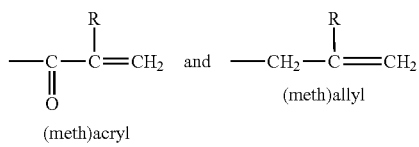

wherein each R is a radical selected from H and methyl.

The polyenes may be compounds or polymers having in the molecule olefinic double bonds that are polymerizable by exposure to radiation. Examples of such materials are (meth)acrylic-functional (meth)acrylic copolymers, epoxy resin (meth)acrylates, polyester (meth)acrylates, polyether (meth)acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Aliphatic and/or cycloaliphatic (meth)acrylates in each case are preferably used. (Cyclo)aliphatic polyurethane (meth)acrylates and (cyclo)aliphatic polyester (meth)acrylates are particularly preferred. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. The polyisocyanate can be reacted with the hydroxyalkyl (meth)acrylate in a 1:1 equivalent ratio or can be reacted with and NCO/OH equivalent ration greater than 1 to form an NCO-containing reaction product that can then be chain extended with a polyol such as a diol or triol, for example 1,4-butane diol, 1,6-hexane diol and/or trimethylol propane. Examples of polyester (meth)acrylates are the reaction products of (meth)acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth)acrylate, trimethylolpropane tri(meth)acrylate, pentaerythritol tri(meth)acrylate and pentaerythritol tetra(meth)acrylate.

Besides (meth)acrylates, (meth)allyl compounds or polymers can be used either alone or in combination with (meth)acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane. The polyisocyanate can be reacted with the hydroxyl-functional allyl ether in a 1:1 equivalent ratio or can be reacted with and NCO/OH equivalent ration greater than 1 to form an NCO-containing reaction product that can then be chain extended with a polyol such as a diol or triol, for example 1,4-butane diol, 1,6-hexane diol and/or trimethylol propane.

As used herein the term "polythiol functional material" refers to polyfunctional materials containing two or more thiol functional groups (SH). Suitable polythiol functional materials for use in forming the radiation curable topcoat composition are numerous and can vary widely. Such polythiol functional materials can include those that are known in the art. Non-limiting examples of suitable polythiol functional materials can include, but are not limited to, polythiols having at least two thiol groups including compounds and polymers. The polythiol can have ether linkages (—O—), sulfide linkages (—S—), including polysulfide linkages (—$S_x$—), wherein x is at least 2, such as from 2 to 4, and combinations of such linkages.

The polythiols for use in the present invention include, but are not limited to, materials of the formula:

wherein $R_1$ is a polyvalent organic moiety and n is an integer of at least 2, typically 2 to 6.

Non-limiting examples of suitable polythiols include, but are not limited to, esters of thiol-containing acids of the formula HS—$R_2$—COOH wherein $R_2$ is an organic moiety with polyhydroxy compounds of the structure $R_3$—$(OH)_n$ wherein $R_3$ is an organic moiety and n is at least 2, typically 2 to 6. These components can be reacted under suitable conditions to give polythiols having the general structure:

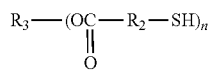

wherein $R_2$, $R_3$ and n are as defined above.

Examples of thiol-containing acids are thioglycolic acid (HS—$CH_2$COOH), α-mercaptopropionic acid (HS—CH($CH_3$)—COOH) and β-mercaptopropionic acid (HS—$CH_2CH_2$COCH) with polyhydroxy compounds such as glycols, triols, tetraols, pentaols, hexaols, and mixtures thereof. Other non-limiting examples of suitable polythiols include, but are not limited to, ethylene glycol bis (thioglycolate), ethylene glycol bis(β-mercaptopropionate), trimethylolpropane tris (thioglycolate), trimethylolpropane tris (β-mercaptopropionate), pentaerythritol tetrakis (thioglycolate) and pentaerythritol tetrakis (β-mercaptopropionate), and mixtures thereof.

Typically, the polyene is present in the clear topcoat composition in amounts of 80 to 98, more typically 90 to 95 percent by weight, and the polythiol material is typically present in amounts of 2 to 20, more usually 5 to 10 percent by weight. The percentages by weight are based on total weight of polyene and polythiol.

The topcoat composition may contain a photoinitiator when exposed to ultraviolet radiation. Suitable photoinitiators are, for example, those that absorb within the wavelength range of 190 to 600 nm.

Examples of photoinitiators for radiation systems are benzoin and benzoin derivatives, acetophenone, and acetophenone derivatives such as, for example, 2,2-diacetoxyacetophenone, benzophenone and benzophenone derivatives, thioxanthone and thioxanthone derivatives, anthraquinone, 1-benzoylcyclohexanol, organophosphorus compounds such as, for example, acyl phosphine oxides. The photoinitiators when present are used in quantities of, for example, from 0.1 to 7 wt. %, preferably 0.5 to 5 wt. %, with reference to the weight of polyene and polythiol and photoinitiators. The photoinitiators may be used singly or in combination.

The topcoats optionally contain customary additives that are present in transparent coatings. These include rheology control agents, anti-foaming agents and wetting agents. For clear topcoat application, hindered amine light stabilizers may be present in the composition. These optional ingredients are present in amounts up to 10, and preferably no more than 5 percent by weight based on weight of the topcoating composition.

The transparent clear topcoat composition used in the content according to the invention may contain diluents such as organic solvents and/or water. However, preferably the compositions are 100 percent solids. Examples of suitable organic solvents are mono- or polyhydric alcohols, e.g., ethylene glycol and butanol, and glycol ethers or esters, e.g., diethylene glycol dialkyl ethers containing a $C_1$ to $C_6$ alkyl. When present, the diluents constitute up to 50 percent by weight of the topcoat composition based on weight of the composition.

The clear topcoats may also contain transparent pigments, such as colloidal silica, and colorants that are soluble in the coating composition such as dyes. These ingredients, if present, are present in the composition in amounts of up to 20, typically up to 10 percent by weight based on weight of the topcoat composition.

The topcoat compositions are applied over a colored basecoat by conventional coating techniques such as spraying.

Examples of basecoats are those conventionally used in the auto refinish business and include physically drying or chemically crosslinking binder vehicles. The basecoats contain organic and/or inorganic color- and/or effect-imparting pigments. The basecoat composition may be organic solvent based or water based compositions. Examples of suitable basecoats are solvent based basecoat compositions based on (meth)acrylic polymers, polyester resins that may be air drying or used in combination with polyisocyanate curing agents. Examples of water-based compositions are air-drying polyurethanes and polyester resins and (meth)acrylic polymers that are used in combination with polyisocyanate curing agents. The basecoats are applied to substrates that may be precoated with customary primer, primer surfacer and intermediate coats, such as those that are used for multilayer coating in the motor vehicle sector. The preferred substrates are metal or plastic parts.

Drying or hardening of the basecoat can be affected at room temperature or at elevated temperature. Drying may preferably be effected over a few minutes, e.g., 3-10 minutes, at 40-80° C. Drying of the basecoat is most preferably effected by means of infrared radiation. IR drying can be effected within 3-6 minutes, for example. The thickness (dry film thickness) of the basecoat is typically 5 to 50 microns.

After the clear topcoat composition is applied to the basecoat, the clear topcoat is cured by exposure to radiation. The radiation can be high-energy radiation or actinic radiation.

A class of high-energy bombardment includes energetic electrons such as those derived from isotopes such as strontium-90, or intense electron beams produced by particle accelerators. Electron beam curing is most useful in applications where very rapid and economical rates are desired. By way of example, in some systems curing periods of less than about one second may be experienced using a total radiation dose of less than about 0.25 megarads.

A class of actinic radiation useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of from 1 second to 15 minutes are typical.

Preferably, for safety reasons, low energy ultraviolet radiation falling within the 200-400 nanometer wavelength interval is preferred. Preferably, the ratio of UV-B content to UV-A content is 1:1 or less.

The thickness (dry film thickness) of the cured clear topcoat is typically from 25 to 160 microns.

EXAMPLES

The following examples are intended to illustrate the invention, and should not be construed as limiting the invention in any way. All parts and percentages are by weight unless otherwise indicated.

Urethane Acrylate

Example A

Urethane Acrylate 06-112-071 (No NCO in Resin)

A urethane acrylate was prepared by heating a mixture of 1,6-hexamethylene diisocyanate, DESMODUR N 3600 from Bayer Material Science (198.8 grams), a free radical inhibitor, 2,6-di-tert-butyl methylol (0.281 grams), dibutyltin dilaurate (0.56 grams), triphenyl phosphite (1.03 grams) and t-butyl acetate (74.2 grams) under nitrogen to a temperature of 70° C. Then, 2-hydroxyethyl acrylate (107.4 grams) was added dropwise over the course of 20 minutes while maintaining the reaction temperature at 70-75° C. Then, 1,4-butanediol (10.18 grams) was added all at once, while maintaining the reaction temperature at 70-84° C. for an additional 30 minutes. IR shows no unreacted isocyanate functionality remains.

Polythiol

Example B

Pentaerythritol tetrakis(3-mercaptopropionate)

Basecoats

Examples C and D

DELTRON DBC 3964 Solvent-Based (Ex. C)
ENVIROBASE T 3964 Aqueous-Based (Ex. D)

Both basecoats are available from PPG Industries and are light sapphire blue in color. The solvent-based basecoat was thinned in a 1:1 volume ratio with DT 870 medium temperature thinner from PPG Industries. The aqueous-based basecoat was thinned by taking 100 volumes of the basecoat and mixing with 10 to 30 volumes of T494 thinner available from PPG Industries.

Clearcoats

Examples E and F

For the purposes of comparison, two (2) different 2K clearcoats were used. They were:
P 190-6659 NEXA HS PLUS express clearcoat (Ex. E)
DELTRON DC 3000 high velocity clearcoat (Ex. F)

Three (3) parts of P 190-6659 clearcoat was mixed with one (1) part P210-872 2K HS PLUS hardener and 0.6 part P852-1689 2K HS PLUS thinner.

Four (4) parts DC 3000 high velocity clearcoat was mixed with one (1) part DC 43085 medium temperature hardener.

Example G

A clearcoat formulation using the urethane acrylate of Example A was prepared from the following ingredients:

| Ingredients | Parts by Weight |
|---|---|
| Urethane acrylate of Ex. A | 125.7 |
| SR 9003[1] | 68.1 |
| DAROCUR 4265[2] | 5.74 |
| BYK 300[3] | 0.86 |
| TUNUVIN 384[4] | 2.72 |
| SANSOL LS-292[5] | 2.15 |
| Butyl acetate | 75.85 |
| TOTAL | 280.45 |
| Polythiol of Ex. B | 16.5 |

[1]Propoxylated glycol diacrylate available from Sartomer.
[2]UV initiator available from Ciba Specialty Chemicals.
[3]Silicon resin solution available from BYK Chemie.
[4]UV absorber available from Ciba Specialty Chemicals.
[5]Pentamethyl-4-piperdinyl sebacate (hindered amine light stabilizer) available from Sankyo Co.

All of the above-mentioned ingredients with the exception of the polythiol were premixed. The polythiol was applied to the formulation immediately before spraying.

Color-Clear Multilayer Coating

The basecoat of Example E was spray applied to primed cold rolled steel panels. The basecoat was applied in two (2) to three (3) coats. The time between each coat was five (5) to ten (10) minutes with a dry film thickness of 0.35 to 0.50 mils (8.9 to 12.7 microns). The time allowed before applying the clearcoats was 15 minutes.

The basecoat of Example D was spray applied to primed cold rolled steel panels. The basecoat was applied in two (2) to three (3) coats. The time between each coat was 3 to 5 minutes with a dry film thickness between 0.40 to 0.80 mils (10.2 to 20.3 microns). The time allowed before applying the clearcoats was 15 minutes.

The clearcoat of Example E was spray applied to the basecoats in two (2) single coats to give between 2 to 2.5 mils (50 to 63.5 microns) dry film thickness with a 5-minute flash between coats. The coated panels were baked at 60° C. for 10 minutes.

The clearcoat of Example F was applied in two (2) coats with 2.4 to 2.8 mils (61 to 71 microns) dry film build. The flash time between coats was 5 minutes.

The clearcoat of Example G was spray applied to the basecoats in two (2) single coats to give between 1 to 3 mils (25 to 75 microns) dry film thickness with a 5-minute flash after each coat.

The coated panels were then subjected to UV radiation for five (5) minutes with a 415 W Autoshot lamp, clear filter, 25 centimeters from the coating surface. The coatings were then tested for Konig hardness within one (1) hour of cure and adhesion after 24 hours. The testing results are reported in the table below.

| Ex. No. | Base-coat | Clear-coat | 1 hour Konig Hardness[1] | 24 hours DOI[2] | 24 hours Gloss[3] | Konig Hardness[1] | Adhesion[4] |
|---|---|---|---|---|---|---|---|
| 1 | Ex. D | Ex. G | 17 | 90 | 86 | 14 | 10 |
| 2 | Ex. C | Ex. G | 19 | 80 | 87 | 17 | 10 |
| 3 | Ex. D | Ex. F | 10 | 100 | 90 | 32 | 10 |
| 4 | Ex. C | Ex. F | 12 | 95 | 91 | 28 | 10 |
| 5 | Ex. D | Ex. E | 11 | 90 | 90 | 26 | 10 |
| 6 | Ex. C | Ex. E | 13 | 85 | 88 | 16 | 10 |

[1] Konig hardness determined according to DIN 53157 Pendulum Damping Test. The higher the value, the harder is the coating.
[2] DOI (distinctness of image) determined by Glow box Model GB11-8 (from Instruments for Research and Industries of Cheltenham, PA).
[3] Gloss 20° gloss determined by use of Byk-Gardner Haze-Gloss Meter.
[4] Adhesion determined by ISO 2409 cross cut test. Values range from 0 to 10 with 10 indicating excellent adhesion.

We claim:

1. A process for refinishing a motor vehicle part comprising forming a multilayer coating on a substrate comprising:
   (a) forming a basecoat layer containing organic and/or inorganic color- and/or effect-imparting pigments on the substrate that is a metal or plastic part of a motor vehicle precoated with a primer, primer surfacer or other it coating;
   (b) forming a clear topcoat layer on the basecoat layer by depositing a radiation curable topcoat composition onto the basecoat layer in which the topcoat composition comprises:
      (i) a polyene comprising polyurethane (meth)acrylate or polyester (meth)acrylate,
      (ii) a polythiol; and
   (c) exposing the topcoat composition to radiation to cure the topcoat.

2. The process of claim 1 wherein the basecoat layer is deposited from a waterborne composition.

3. The process of claim 1 wherein the basecoat layer is deposited from an organic solventborne composition.

4. The process of claim 1 in which the polythiol has the structural formula $R_1-(SH)_n$ where $R_1$ is an organic moiety and n is at least 2.

5. The process of claim 4 in which $R_1$ contains ester groups.

6. The process of claim 4 in which $R_1$ is derived from a polyol.

7. The process of claim 4 in which the polythiol is the reaction product of a thiol-functional organic acid and a polyol.

8. The process of claim 4 in which n is from 2 to 4.

9. The process of claim 1 in which the polyene is present in the topcoat composition in amounts of 50 to 98 percent by weight and the polythiol is present in amounts of 2 to 20 percent by weight; the percentages by weight being based on weight of polyene and polythiol.

10. The process of claim 1 in which the polyene is present in the topcoat composition in amounts of 90 to 95 percent by weight and the polythiol is present in amounts of 5 to 10 percent by weight; the percentages by weight being based on weight of polyene and polythiol.

11. The process of claim 1 in which the topcoat is exposed to ultraviolet radiation falling within the 200-400 nanometer wavelength interval.

12. The process of claim 11 in which the ratio of UV-B content to UV-A content of the radiation is 1:1 or less.

13. A substrate coated with a multilayer coating in accordance with claim 1.

14. A process for refinishing a motor vehicle part comprising forming a multilayer coating on a substrate comprising:
   (a) forming a basecoat layer containing organic and/or inorganic color- and/or effect-imparting pigments on the substrate that is a metal or plastic part of a motor vehicle precoated with a primer, primer surfacer or other intermediate coating;
   (b) forming a clear topcoat layer on the basecoat layer by depositing a radiation curable topcoat composition onto the basecoat layer in which the topcoat composition comprises:
      (i) a polyene comprising polyurethane (meth)acrylate,
      (ii) a polythiol; and
   (c) exposing the topcoat composition to radiation to cure the topcoat.

* * * * *